US008033251B2

(12) United States Patent
Bagnall et al.

(10) Patent No.: US 8,033,251 B2
(45) Date of Patent: Oct. 11, 2011

(54) AQUATIC APPARATUS WITH MIRROR

(75) Inventors: Gary Wayne Bagnall, Arroyo Grande, CA (US); Stephen H. Dalrymple, Arroyo Grande, CA (US)

(73) Assignee: Zoo Med Laboratories, Inc., San Luis Obispo, CA (US)

( * ) Notice: Subject to any disclaimer, the term of this patent is extended or adjusted under 35 U.S.C. 154(b) by 201 days.

(21) Appl. No.: 12/330,356

(22) Filed: Dec. 8, 2008

(65) Prior Publication Data

US 2010/0139571 A1  Jun. 10, 2010

(51) Int. Cl.
*A01K 63/00* (2006.01)
(52) U.S. Cl. ...................................... 119/258
(58) Field of Classification Search ........... 119/258, 119/247, 253, 707, 708
See application file for complete search history.

(56) References Cited

U.S. PATENT DOCUMENTS

| | | | |
|---|---|---|---|
| 3,119,371 A | | 1/1964 | Zuckerman |
| 3,265,388 A | * | 8/1966 | Kane, Jr. ........................ 472/67 |
| 3,706,299 A | | 12/1972 | Hendges |
| 4,639,101 A | * | 1/1987 | Stefancin, Jr. ................ 359/855 |
| 4,858,425 A | * | 8/1989 | Cheredaryk et al. ............. 59/80 |
| 5,323,727 A | * | 6/1994 | Heaton ......................... 114/315 |
| 6,742,477 B1 | | 6/2004 | Marraudino |
| 2004/0246703 A1 | * | 12/2004 | Adams ............................ 362/84 |
| 2005/0193941 A1 | * | 9/2005 | Schlasinger .................. 116/209 |
| 2007/0008622 A1 | * | 1/2007 | Sommer ....................... 359/466 |
| 2008/0053376 A1 | * | 3/2008 | Marks ........................... 119/248 |

OTHER PUBLICATIONS

Web page at http://www.fish.com/largeimage.asp?ID=49489 printed out on Nov. 14, 2008.
Web page at http://www.fish.com/itemdy00.asp?T1=701039%20BAY printed out on Nov. 14, 2008.
Web page at http://www.aquariumguys.com/oceanvisions2.html printed out on Nov. 14, 2008.
Web page at http://www.aquariumadvice.com/forums/f20/mirror-for-background-88319.html printed out on Nov. 14, 2008.
Web page at http://www.aquaticplantcentral.com/forumapc/diy-aquarium-projects/47865-tinted-mirror . . . printed out on Nov. 14, 2008.
Web page at http://www.barrreport.com/general-plant-topics/4125-has-anyone-ever-used-mirror-background.html printed out on Nov. 14, 2008.
Web page at http://www.pennplax.com/Pages/Aqua.pages..../Aqua14F.html printed out on Nov. 14, 2008.

* cited by examiner

*Primary Examiner* — Rob Swiatek
*Assistant Examiner* — Kristen Hayes
(74) *Attorney, Agent, or Firm* — Mitchell Silberberg & Knupp, LLP

(57) ABSTRACT

Provided are, among other things, aquatic apparatuses. In one, an aquarium is at least partially filled with water, and a mirror is disposed within the water, the mirror having a reflective surface area that is between 1-40 square inches. In another, an aquarium is at least partially filled with water, and a mirror is attached to, and thereby suspended beneath, a buoyant object in the water. In yet another, a mirror is attached a buoyant object, the mirror having a reflective surface area that is between 1-40 square inches.

6 Claims, 4 Drawing Sheets

AQUATIC APPARATUS WITH MIRROR

THIS FIELD OF THE INVENTION

The present invention pertains to an apparatus for use in an aquatic setting, such as an aquarium.

BACKGROUND

A variety of different structures, devices and articles for use within aquariums currently exist. However, additional apparatuses and methods for using such apparatuses still are desirable.

SUMMARY OF THE INVENTION

The present invention addresses this need by providing, among other things, a flotation-suspended, relatively small, easily removable and/or easily coverable mirror apparatus, e.g., for use in an aquarium or other aquatic setting.

Thus, one embodiment of the invention is directed to an aquatic apparatus having an aquarium that is at least partially filled with water, and a mirror that is disposed within the water, the mirror having a reflective surface area that is between 1-40 square inches.

Another embodiment is directed to an aquatic apparatus having an aquarium that is at least partially filled with water, and a mirror that is attached to, and thereby suspended beneath, a buoyant object in the water.

A still further embodiment is directed to an aquatic apparatus having a mirror that is attached to a buoyant object, the mirror having a reflective surface area that is between 1-40 square inches.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Figure 1:
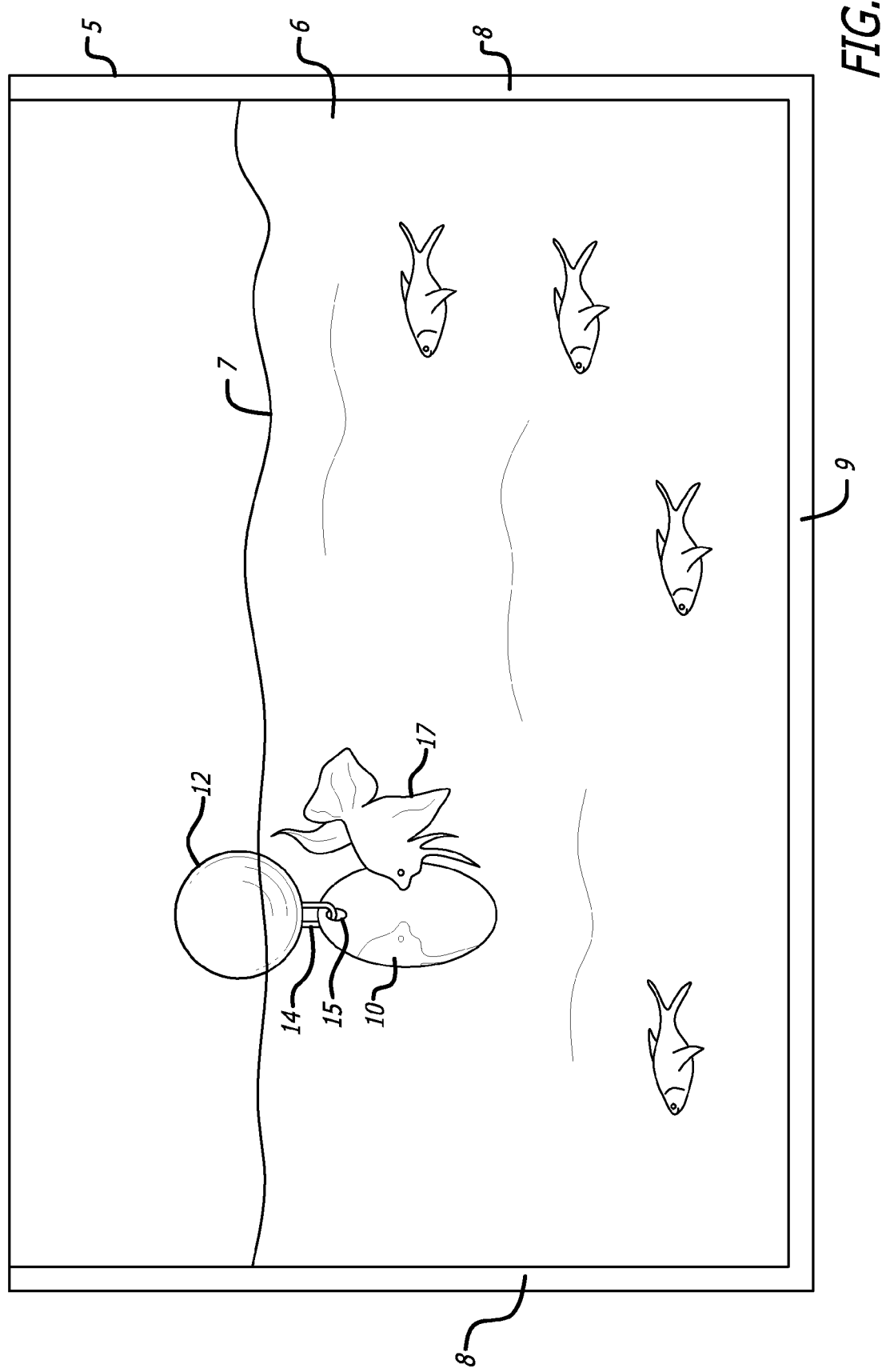
FIG. 1 is a front elevational view of an aquarium with a flotation-suspended mirror.

FIG. 1 illustrates an aquarium 5 that is partially filled with water 6, up to a surface level 7. In the embodiments depicted in the attached drawings, aquarium 5 is a rectangular aquarium, meaning that each of its four side walls 8 (two of which being depicted in FIG. 1) and its bottom surface 9 is a flat rectangular panel (all typically made of glass or some other transparent material). However, it should be noted that aquariums of any size or shape may be used in conjunction with the present invention, subject only to any physical requirements pertaining to particular embodiments, as described herein. It is further noted that general references herein to a side wall are not intended to be limited to any particular shape or configuration, unless expressly stated to the contrary. Absent any such statement, such references should be understood as encompassing any side surface of the aquarium 5 (e.g., flat, convex, concave or having any desired contour).

Even more generally, it is noted that the term "aquarium", as used herein, is intended to mean a container (such as a glass tank) in which living aquatic animals are kept. As such, the term aquarium, as used herein, encompasses paludariums, vivariums, or even glass jars used for air-breathing or small fish.

Aquarium 5 preferably is of a type commonly used in the home and/or in a place of business (e.g., in an office or in a commercial establishment such as a restaurant). Such an aquarium typically has a capacity of between approximately 1-200 gallons.

Suspended within the water 7 in the embodiment illustrated in FIG. 1 is a mirror 10 that is attached to, and thereby suspended in a vertical orientation beneath, a floating (or buoyant) object 12. In the preferred embodiments, the mirror 10 is substantially or entirely flat and is either circular or oval-shaped. However, in alternate embodiments mirror 10 can be rectangular (e.g., square) or any other shape.

Preferably, the main body of buoyant object 12 is made of a plastic and/or a polymer and has a hollow or air-filled interior, so as to reduce manufacturing costs. In the current embodiment, the main body of buoyant object 12 is approximately disk-shaped, although it instead could be spherical or any other shape.

As shown in FIG. 1, in the present embodiment buoyant object 12 includes a loop 14 that extends through an opening 15 within mirror 10. Loop 14 can be continuous such that mirror 10 is permanently attached to buoyant object 12 or instead can be provided with a clasp or other mechanism for removing and/or replacing mirror 10 when desired. In any event, because opening 15 is slightly larger than the width of the material forming loop 14, mirror 10 is capable of moving somewhat (e.g., rotating within a range of at least 10-20°), relative to the buoyant object 12. Thus, FIG. 1 illustrates one example in which mirror 10 is non-rigidly attached to the buoyant object 12.

In alternate embodiments, mirror 10 is attached to buoyant object 12 by a string, so that mirror 10 can move to an even greater degree relative to buoyant object 12. It should be noted that although a string is mentioned in several embodiments discussed herein, any other strip or piece of pliable material could be used in place of a string. In any event, mirror 10 preferably is non-rigidly attached to the buoyant object 12 so that it is capable of turning or otherwise moving relative to the buoyant object 12.

On the other hand, in some embodiments mirror 10 is rigidly attached to buoyant object 12. Even in embodiments where the two components 10 and 12 are rigidly or semi-rigidly attached to each other, mirror 10 is capable of some motion within aquarium 5 (e.g., moving relative to the surfaces of the aquarium 5, i.e., side walls 8 and bottom surface 9). This is because the entire structure (i.e., the combination of mirror 10 and buoyant object 12) is free-floating.

In use, the entire structure, including buoyant object 12 and mirror 10, is placed into the water 6. A fish 17 swims up to mirror 10, sees its reflection (which it typically assumes is another fish), and responds accordingly. The effect is particularly pronounced for Betta fish, which often will flare their fins in response. As a result, the mirror 10 can be used: to "exercise" the Betta fish's fins, to reduce any boredom that might otherwise result from captivity, and/or to allow the fish to engage in certain natural behaviors that they otherwise might not have a reason to perform. After a period of time (e.g., 3-10 minutes or, more preferably a maximum of approximately 5 minutes), the structure that includes mirror 10 and buoyant object 12 is removed from the water 6. This process preferably is repeated once or twice a day, thereby providing an appropriate level of stimulation for the Betta fish.

It is noted that the ability of the mirror 10 to move (e.g., independently of the buoyant object 12 and/or in conjunction with it) when the fish 17 bumps up against it, often can further the impression that it actually is a second fish. However, too much movement might be problematic, e.g., if the mirror rotates away from the fish 17. Accordingly, the attachment mechanism illustrated in FIG. 1, which allows some but limited motion relative to the buoyant object 12, generally is preferred.

Another aspect of the invention that can further the desired illusion is the use of a relatively small mirror. Accordingly, mirror 10 preferably has a reflective surface area that is between 1-40 square inches and, more preferably, between 1-10 square inches. As a result of using a relatively small mirror, there is relatively little change in the fish's environment, other than the reflection of the fish 17 itself (which fish 17 generally assumes to be another fish), thereby often minimizing the significant disorientation that potentially could arise when using a larger mirror.

While it often is beneficial to simulate the appearance of another fish in the foregoing manner (e.g., for the reasons noted above), too much exposure might result in undue stress. Accordingly, one advantage of the structure that includes mirror 10 is that it can be easily placed into the aquarium 5 and just as easily removed from it. In fact, by making the buoyant object 12 sufficiently buoyant, enough of it can remain above the water's surface 7 that it can be grasped at that portion and removed without ever having to go beneath the surface 7. Needless to say, it also can be placed into aquarium 5 without the user's hand having to break the surface 7 and without having any portion of the buoyant object 12 that touches the user's hand exposed to the water 6 (thereby reducing the possibility of contamination).

A still further advantage of the present structure is that the mirror 10 can be placed arbitrarily within the aquarium 5. In particular, mirror 10 can be placed sufficiently far from the surfaces of the aquarium (e.g., side walls 8 and bottom surface 9) so that it appears as a more natural part of the fish's environment. For these reasons, a mirror according to the present invention preferably is disposed (e.g., suspended) at least 1-2 inches from any surface of the aquarium.

For all of the foregoing reasons, as well as ease-of-use and cost-of-production, the foregoing embodiment is the currently preferred embodiment of the invention. However, other embodiments in which a mirror is suspended or otherwise disposed within the water of an aquarium also are contemplated. Such alternate embodiments often can achieve at least some of those advantages and, in certain cases, can provide some additional advantages.

Figure 2:
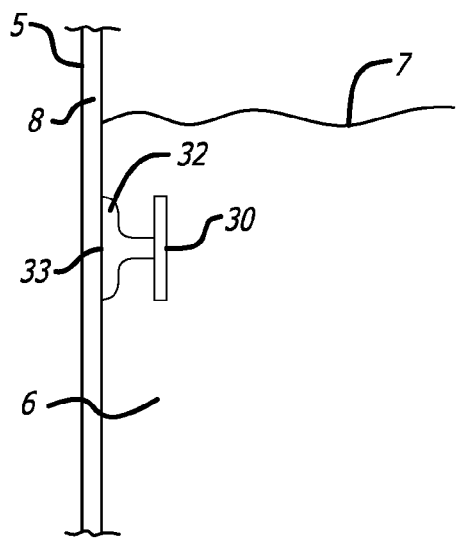
FIG. 2 is a front elevational view of a portion of an aquarium having a mirror attached to the inner surface of the aquarium's side wall beneath the surface of the water.

For instance, FIG. 2 is a front elevational view of a portion of aquarium 5 having a mirror 30 that is attached to the inner surface of the aquarium's side wall 8 at a point beneath the surface 7 of the water 6, using a mounting structure 32. The preferred shapes and ranges of sizes for mirror 30 are the same as those for mirror 10 (discussed above), although mirror 30 typically will not include an opening 15.

The proximal end 33 of the mounting structure 32 preferably includes a suction cup for attaching to the inner surface of side wall 8 (in which case side wall 8 preferably is flat, at least within the area of such attachment). However, the proximal end 33 of structure 32 instead could include a magnet which attaches to the inner surface of side wall 8 with the use of an opposite-pole magnet placed against a corresponding point on the outer surface of side wall 8. Still further, the proximal end 33 of structure 32 could include a flat surface (or a surface having a contour that matches any contour of side wall 8), with such proximal end 33 then bonded to the inner surface of side wall 8, e.g., using a permanent or semi-permanent adhesive material.

In any event, mounting structure 32 can be fixedly attached to mirror 30, e.g., by: forming the two components as a unitary piece, using screws, using glue or using any other means for effecting a fixed attachment. Alternatively, mirror 30 can be movably and/or semi-rigidly attached to mounting structure 32, e.g., using a ball-and-socket joint.

The use of a separate mounting structure 32 typically provides additional options for allowing a user to quickly and/or easily remove mirror 30 from, and then insert it back into, the aquarium 5. In addition, an appropriately configured mounting structure 32 can provide space between mirror 30 and the aquarium's side wall 8, e.g. allowing mirror 30 to be located more toward the interior of aquarium 5. However, in some embodiments mounting structure 32 is omitted entirely, e.g., by simply gluing mirror 30 to side wall 8.

Figure 3:
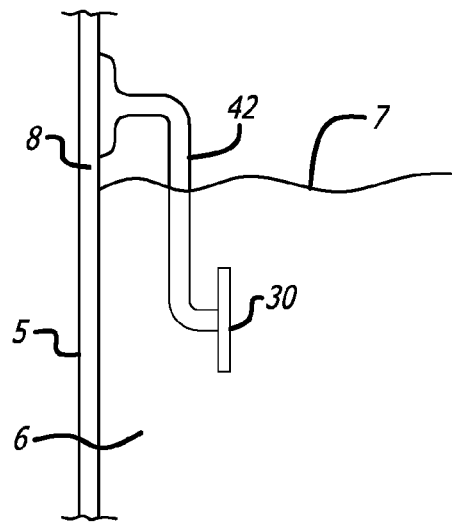
FIG. 3 is a front elevational view of a portion of an aquarium having a mirror suspended at a fixed position within the water by being attached, using a shape-retaining attachment structure, to a point above the surface of the water on the inner surface of the aquarium's side wall.

FIG. 3 illustrates a similar embodiment, in which mirror 30 is suspended within the water 6, but in this embodiment using a different mounting structure 42. Unlike mounting structure 32, mounting structure 42 attaches to the inner surface of side wall 8 at a position that is above the surface 7 of the water 6 and, from that attachment position, extends down beneath the surface 7 to the point at which it attaches to mirror 30. In this way, the entire assembly can be attached to the aquarium 5 with only the mirror 30 and a portion of mounting structure 42 entering the water 6 (assuming the aquarium 5 is partially filled with water 6 when the apparatus is being installed). Other than this difference in configuration, the considerations pertaining to mounting structure 42 generally are the same as those pertaining to mounting structure 32 (discussed above), and vice versa. In the present embodiment, mounting structure 42 preferably is shape-retaining, e.g., rigid, along its entire length, so that mirror 30 remains at a fixed position within the water 6. However, in alternate embodiments, mounting structure 42 instead is semi-rigid, e.g., in the nature of a gooseneck lamp, so that the fixed position of mirror 30 can be changed or adjusted as desired.

Figure 3A:
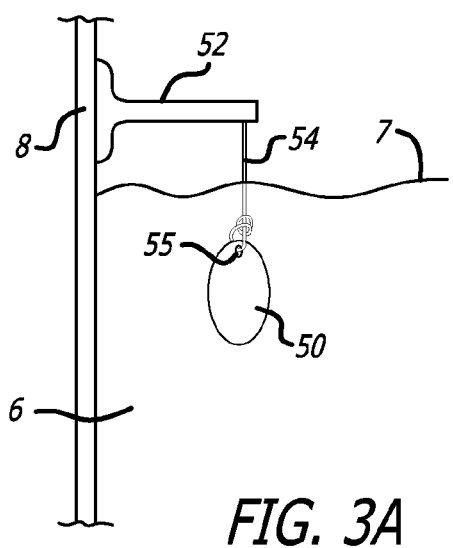
FIG. 3A is a front elevational view of a portion of an aquarium having a mirror movably suspended within the water by a string, with the string being connected at its proximal end to an attachment mechanism, and with the attachment mechanism being attached to a point above the surface of the water on the inner surface of the aquarium's side wall.

FIG. 3A illustrates a similar embodiment in which a mirror 50 is suspended within the water 6 and is attached to a mounting structure 52 which, in turn, is attached to the inner surface of side wall 8 at a point above the water's surface 7. However, in the present embodiment mounting structure 52 includes a string 54 from which mirror 50 is suspended (rather than being rigidly or semi-rigidly held in place). As a result, in the present embodiment mirror 50 has a significant ability to move within water 6, e.g., when it comes into contact with a fish.

In the specific embodiment illustrated in FIG. 3A, mirror 50 includes an opening 55 through which string 54 is looped. However, in alternate embodiments other means for attaching string 54 to mirror 50 can be employed (e.g., using a separate ring on the back of mirror 50 or gluing string 54 to the back of mirror 50). Generally speaking, the considerations pertaining to mirror 50 are identical to those pertaining to mirror 10 (discussed above). For example, as noted above, it generally is preferred to maintain a minimum distance between mirror 50 and the aquarium's side walls 8. Mounting structure 52 can, e.g., use any of the means for attaching to the inner surface of side wall 8 that have been discussed above.

Figure 4:
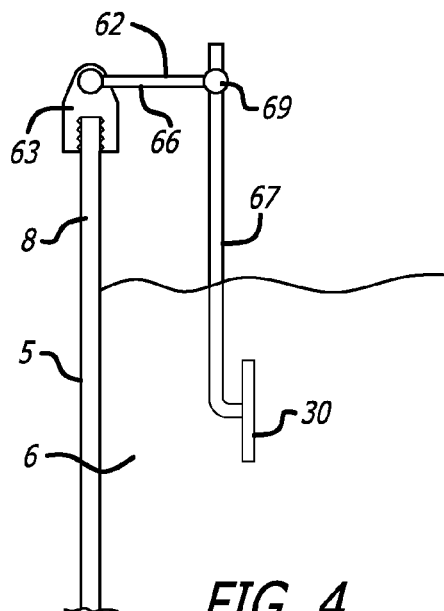
FIG. 4 is a front elevational view of a portion of an aquarium having a mirror suspended at a fixed position within the water by being attached, using a clamping mechanism, to the top edge of the aquarium's side wall.

FIG. 4 illustrates a still further embodiment. Here, the mirror 30 is suspended at a fixed position within the water 6 through the use of a mounting structure 62, which in turn is attached, using a clamp 63, to the top edge of the aquarium's side wall 8. In one implementation, clamp 63 is spring-biased to the closed position and then squeezed open for installing it onto and removing it from the aquarium 5 (e.g., in the nature of a conventional clip). In another embodiment, clamp 63 can open and close using a threaded mechanism (e.g., in the nature of a conventional C-clamp).

In the present embodiment, the mounting structure 62 also includes two elongated members: a horizontal member 66 and a vertical member 67 which together hold mirror 30 at a fixed position within the water 6. In addition, horizontal member 66 includes an opening at or near its proximal end through which vertical member 67 slides, allowing the vertical position of mirror 30 to be adjusted. By then tightening a screw 69, the user locks vertical member 67 (and, correspondingly, mirror 30) into place. Of course, screw 69 can be replaced with any other tightening or locking mechanism, such as a clamp or a pin.

Figure 5:
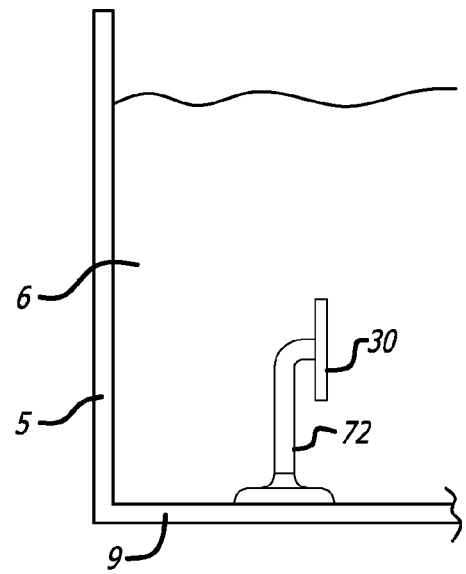
FIG. 5 is a front elevational view of a portion of an aquarium having a mirror suspended at a fixed position within the water by being attached to a weighted structure that rests on a surface within the aquarium.

The foregoing embodiments involve a mirror that can be easily removed from and inserted into the aquarium by being detachably attached to a surface or some other portion of the aquarium. In a still further embodiment, illustrated in FIG. 5, the mirror 30 is suspended at a fixed position within the water 6 by being attached to a weighted structure 72 that simply rests on the bottom 9 of the aquarium 5, or any other surface within aquarium 5. More specifically, the overall structure that includes mirror and weighted structure 72 has sufficient mass density so as to remain submerged within the water 6 due to gravity alone. More preferably, for stability purposes, most of the mass density is provided near the bottom of weighted structure 72, and the overall structure (including mirror 30 and weighted structure 72) has a mass density that is at least 125-150% of the mass density of the water 6.

Figure 6:
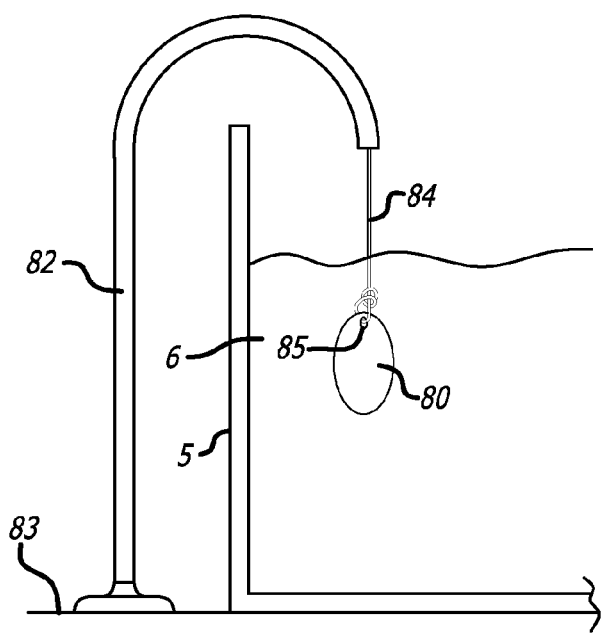
FIG. 6 is a front elevational view of a portion of an aquarium having a mirror movably suspended within the water by a string, which is connected to a suspension mechanism that rests on a surface outside of the aquarium.

A still further embodiment is illustrated in FIG. 6. Here, a mirror 80 is supported by a stand 82 that extends from outside of the aquarium 5. In the specific embodiment illustrated in FIG. 6, the stand 82 rests on the same surface 83 that supports the aquarium 5. However, in alternate embodiments, a similar stand could be supported by a different surface or could be fixedly attached to an object outside of aquarium 5, or even to an outer surface of aquarium 5 itself.

In any event, in the present embodiment the mirror 80 is suspended from a string 84 that is attached at one end to stand 82 and at the other end to an opening 85 within mirror 80. As a result, mirror 80 is able to move fairly freely within water 6. However, in alternate embodiments mirror 80 is rigidly attached to stand 82, i.e., fixed within water 6.

Figure 7:
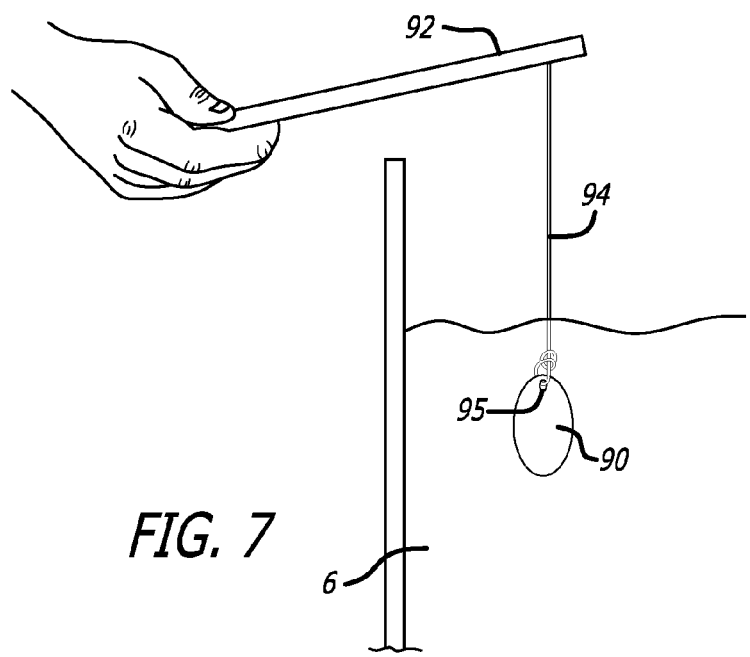
FIG. 7 is a front elevational view of a portion of an aquarium having a mirror movably suspended within the water by a string, which is attached to an article that can be manually manipulated.

Each of the foregoing embodiments permits the user to place a mirror within the water 6 in an aquarium 5, leave it largely unattended for any desired period of time, and then easily and quickly remove it. In the embodiment shown in FIG. 7, a user is able to actively manipulate a mirror 90 within the water 6. Here, the mirror 90 is suspended from a string 94 that is attached at one end to an opening 95 within mirror 90 and at the other end to an elongated rod 92 (or other rigid support article). Such an arrangement can allow mirror 90 to move, to some extent, independently of rod 92 and also can isolate mirror 90 from at least some of the vibrations that might occur within rod 92.

However, in alternate embodiments the string is replaced with a rigid segment, e.g., fixedly attached to rod 92. In other words, in such alternate embodiments the entire support structure supporting mirror 90, from the point at which the user grasps it to the point at which it attaches to mirror 90, is rigid, so that any movements of such a support mechanism by the user are directly conveyed to the mirror 90.

In many of the embodiments discussed above, a mirror (or in some cases, an entire mirror assembly) is temporarily disposed within the water 6, in that it can be readily (e.g., quickly and easily) inserted into and removed from the water 6 in an aquarium 5, as opposed to a permanent attachment which would require a significant amount of time and effort to remove. As noted above, this ability to expose the fish to the mirror only for limited periods of time often is very beneficial.

Figure 8:
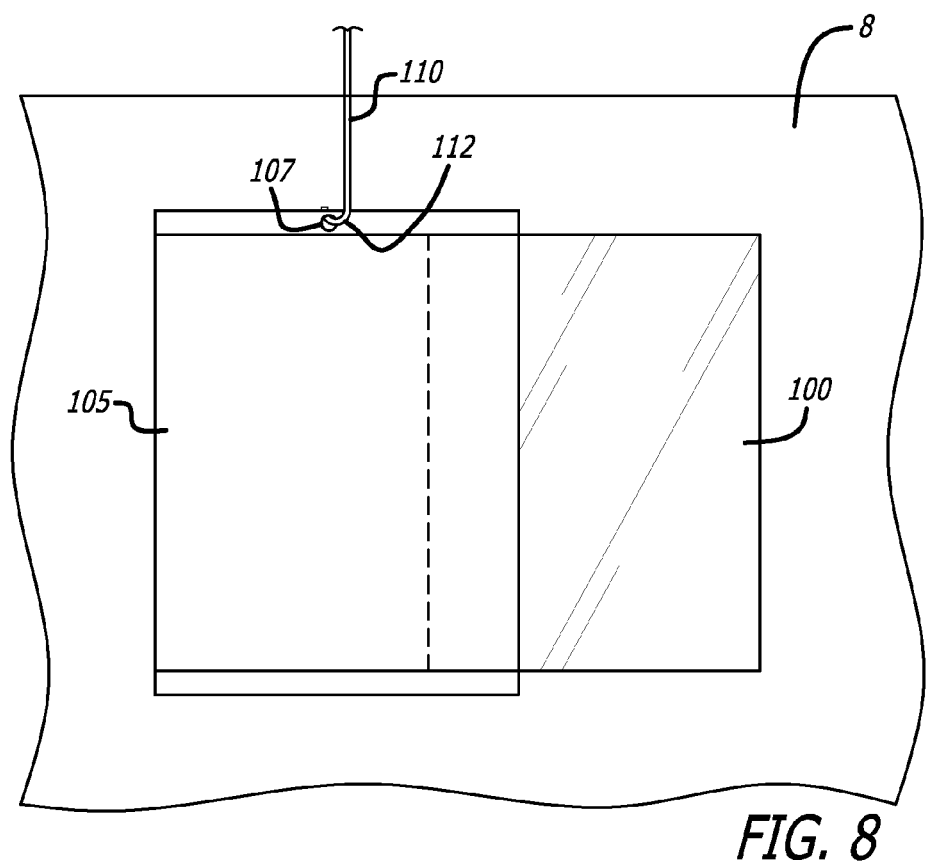
FIG. 8 is a front elevational view of a mirror mounted on an inner surface of an aquarium within the water, together with a removable and replaceable cover for the mirror and an apparatus for sliding the cover so as to expose or block the mirror.

In the embodiment shown in FIG. 8, the same benefit is achieved in a somewhat different manner. Here, a mirror 100 is attached to the inner surface of the aquarium's side wall 8 (e.g., using an adhesive material). In addition, the mirror 100 is provided with a cover 105 that slides horizontally across mirror 100. For this purpose, e.g.: (1) the upper and lower edges of mirror 100 can be provided with a track that supports the corresponding upper and lower edges of cover 105 or, alternatively, (2) the top and bottom edges of cover 105 can be hook-shaped so that they wrap around the corresponding top and bottom edges of mirror 100.

Cover 105 preferably is provided with an opening 107 (or other engagement element). Then, cover 105 can be manipulated using a corresponding apparatus, e.g., an apparatus 110 that includes a hook 112 at its distal end. In addition, because apparatus 105 preferably also includes an elongated handle that is sufficiently long to extend to a point above the surface 7 of the water 6 in the aquarium 5, a user can grasp the distal end of the apparatus 110 from a position outside of the water 6 and slide cover 105 to the desired position. As a result, the user can expose mirror 100 and then cover it whenever desired by inserting only the distal portion of apparatus 110 into the water 6. Because cover 105 preferably is opaque, or at least has very limited transparency, the user can control when the fish are able to see mirror 100.

In each of the embodiments described above, the mirror preferably is vertically oriented within the water, with the particular manner in which such vertical orientation is maintained differing from embodiment to embodiment. In some embodiments, the mirror is rigidly or semi-rigidly held in such an orientation. In others, it is suspended by a string or similarly pliable material at a point near the mirror's edge.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. An aquatic apparatus for use in an aquarium, comprising:
    a buoyant float;
    a loop suspended from the float and attached to the float for placement beneath a water level; and
    a mirror attached to the loop, the mirror including an aperture through which the loop extends for coupling the mirror to the float in a manner, the aperture being slightly larger than a width of the loop thereby allowing for limited relative movement between the float and the mirror as the mirror hangs beneath the water level within the aquarium,
    wherein the mirror has a reflective surface area that is between 1-40 square inches and the aquatic apparatus in its entirety is floating.

2. The aquatic apparatus according to claim 1, wherein the mirror is suspended in the water at least 2 inches from any surface of the aquarium.

3. The aquatic apparatus according to claim 1, wherein the reflective surface area of the mirror is between 1-10 square inches.

4. The aquatic apparatus according to claim 1, wherein the mirror is suspended beneath the float in a vertical orientation.

5. The aquatic apparatus according to claim 1, wherein the mirror is circular or oval-shaped.

6. The aquatic apparatus according to claim 1, wherein the aperture is formed at a point near an edge of the mirror.

* * * * *